June 7, 1955  R. A. POWLEY  2,710,327
STITCHING HEAD FOR WELDER
Filed March 31, 1952  4 Sheets-Sheet 4
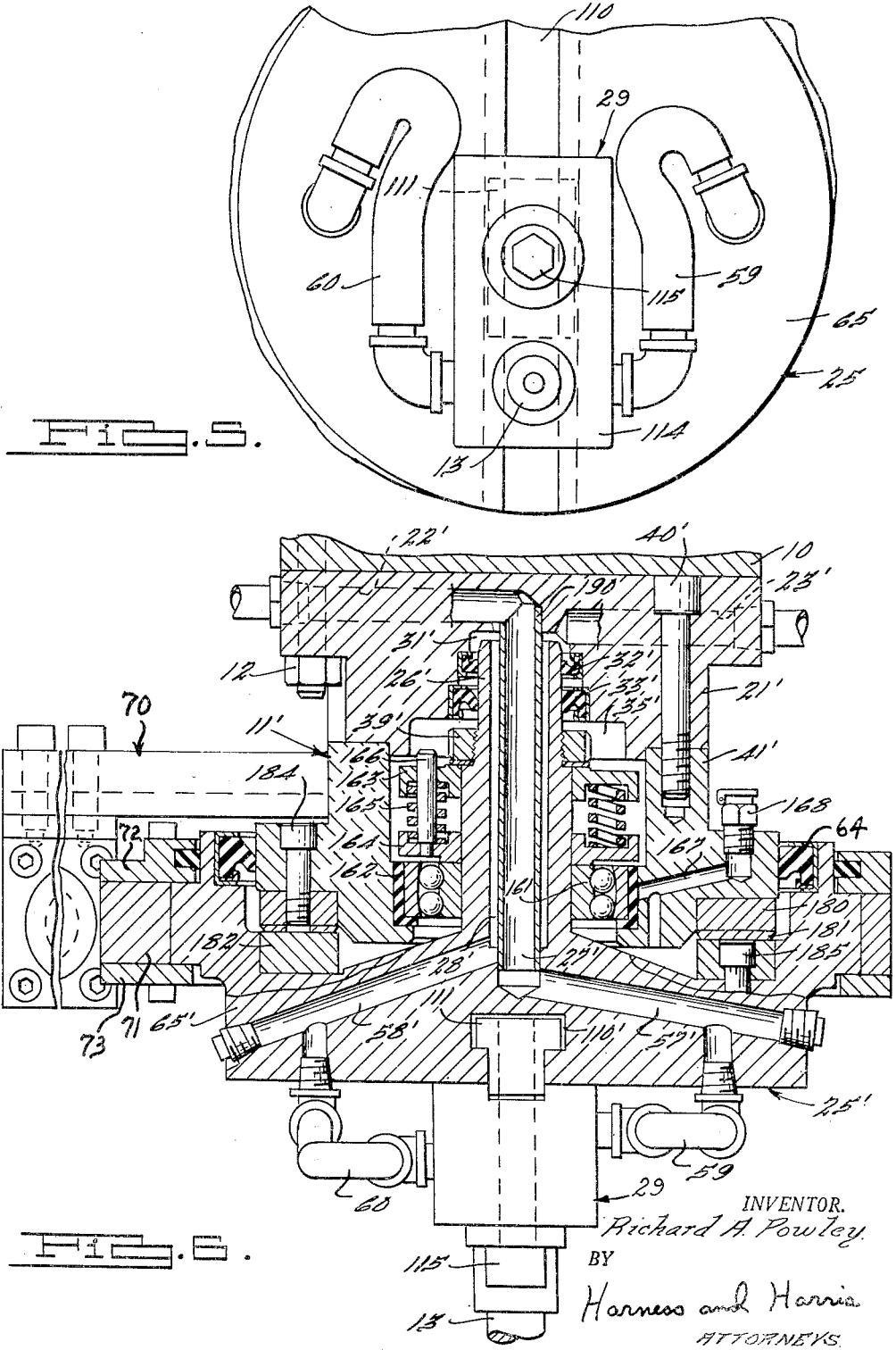
INVENTOR.
Richard A. Powley
BY
Harness and Harris
ATTORNEYS.

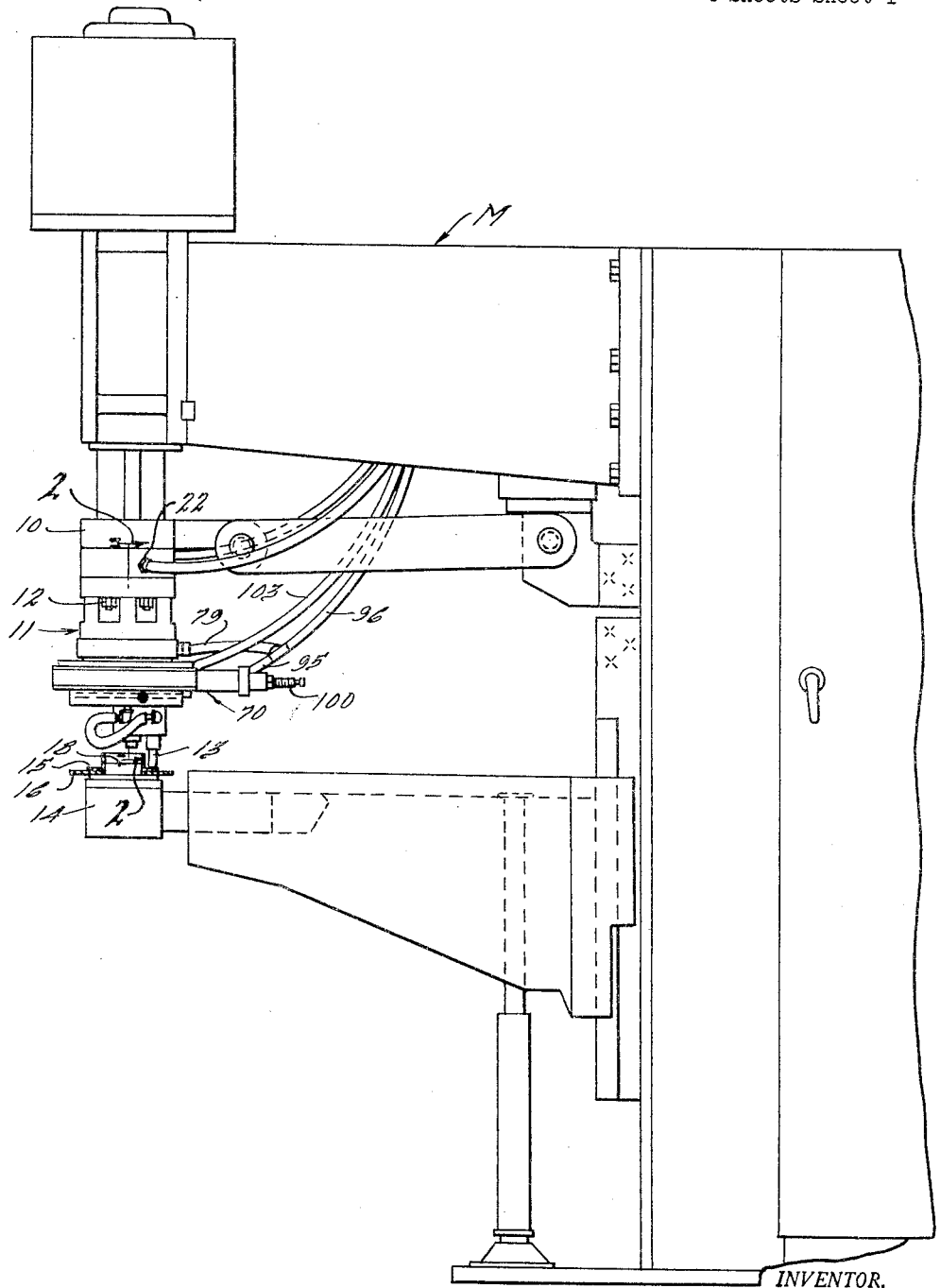

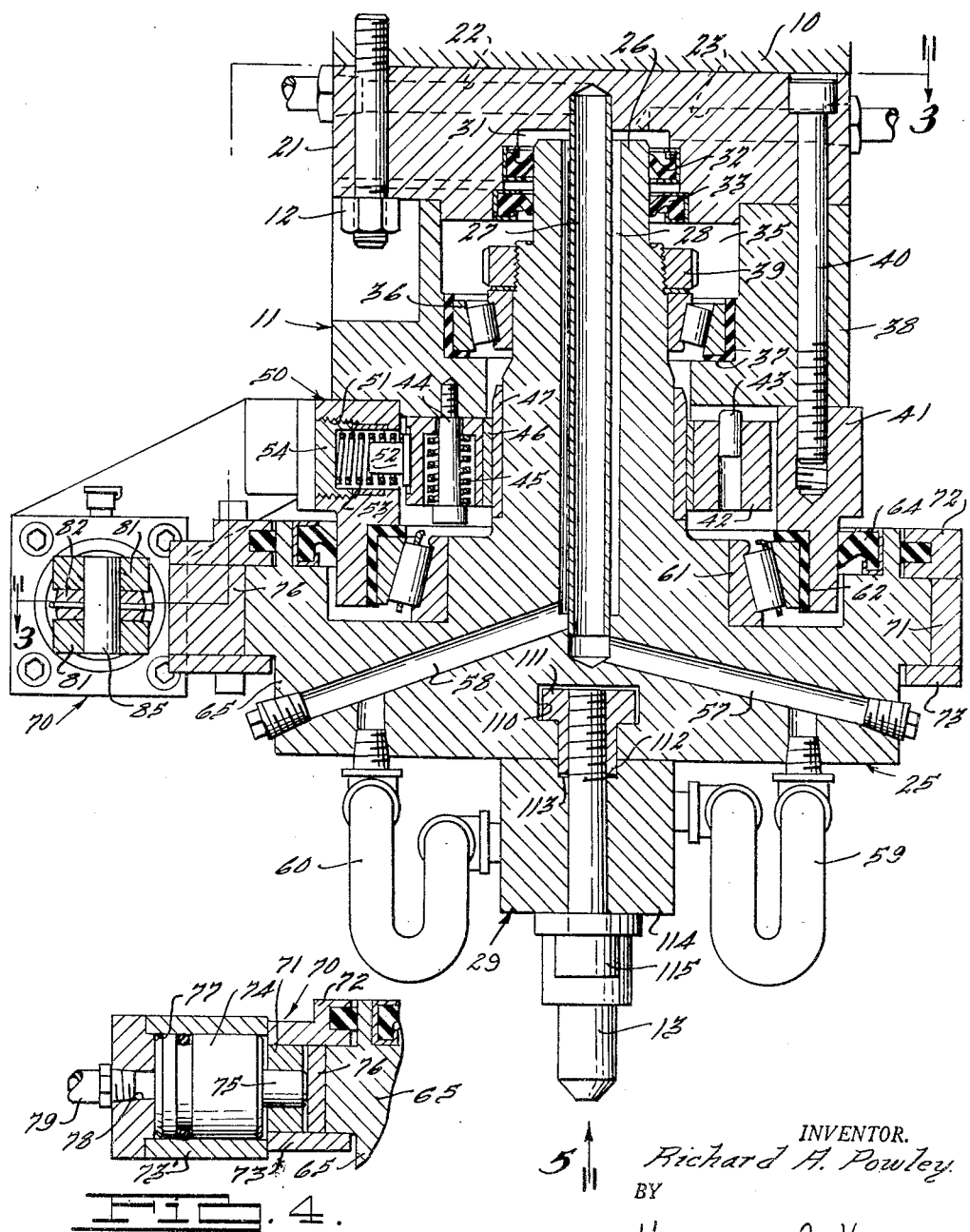

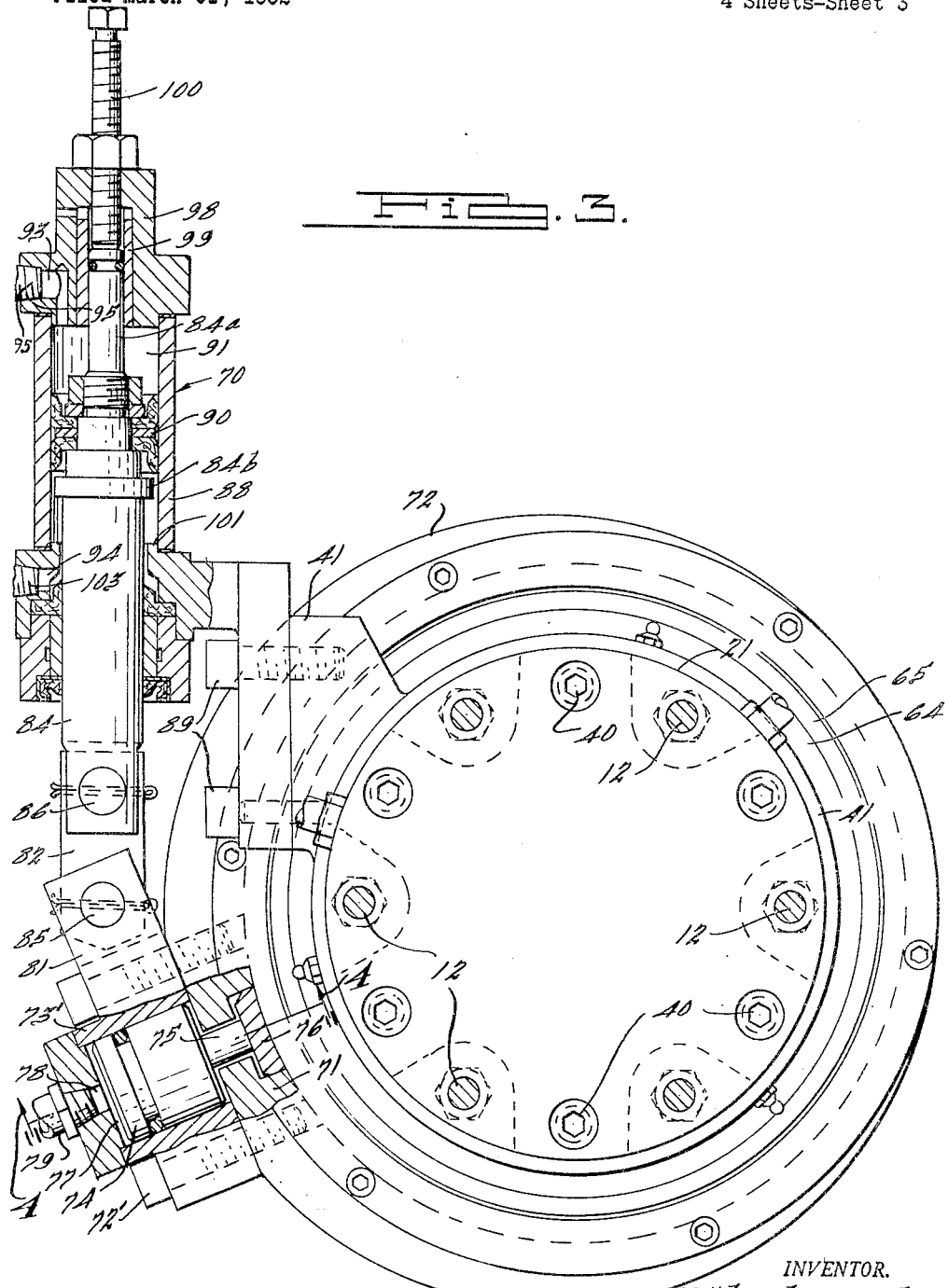

United States Patent Office 2,710,327
Patented June 7, 1955

2,710,327

STITCHING HEAD FOR WELDER

Richard A. Powley, Birmingham, Mich., assignor to Chrysler Corporation, Highland Park, Mich., a corporation of Delaware Application March 31, 1952, Serial No. 279,577

5 Claims. (Cl. 219—4)

This invention relates to electrically operated spot welding machines and particularly to a head assembly for such machines that will provide for stitch welding of infinitely variable stitch spacing whereby overlapping as well as spaced stitch welds may be readily accomplished.

It is a primary object of this invention to provide a welding head that may be readily attached to any substantially conventional spot welding machine to permit the welding machine to be used for stitch welding of the overlapping as well as the spaced stitch type.

It is another object of this invention to provide a head assembly attachment for spot welding machines that may be readily connected to the conventional controls of such welding machines whereby stitch welding in circular patterns may be automatically accomplished.

It is another object of this invention to provide a stitch weld head for a spot welding machine that is simple, compact, rugged and constructed such that stitch welding in circular patterns may be efficiently accomplished.

It is still another object of this invention to provide an electrode holder for rotary head spot welding machines that is of a simplified, improved design.

It is a further object of this invention to provide a novel type of rotatable electrode head having improved spindle bearing support means and an improved arrangement for transferring current between the head casing and its supported spindle element.

Other objects and advantages of this invention will become readily apparent from a reading of the subsequent description and a consideration of the related drawings wherein:

Fig. 1 is a partial side elevation of a spot welding machine having the stitch head embodying this invention attached thereto;

Fig. 2 is an enlarged sectional elevational view of the switch head assembly shown in Fig. 1, the view being taken along the reference line 2—2 of Fig. 1;

Fig. 3 is a sectional elevational view of the brake device and the associated head rotating mechanism of the stitch head assembly, the view being taken along the reference line 3—3 of Fig. 2;

Fig. 4 is a sectional elevational view of portions of the stitch head assembly shown in Fig. 2, the view being taken along the reference line 4—4 of Fig. 3;

Fig. 5 is a partial plan view of the lower side of the stitch head assembly, the view being taken looking in the direction of the arrow 5 of Fig. 2; and Fig. 6 is an enlarged sectional elevational view corresponding to Fig. 2 of a modified form of stitch head assembly embodying this invention.

Fig. 1 of the drawings shows in side elevation the working portions of an electrically operated spot welding machine M. Machine M includes a vertically disposed, reciprocatable ram 10 that has the stitch head assembly 11 detachably connected to the lower end thereof by the bolt and nut connectors 12. The stitch head assembly 11 carries the usual movable electrode 13 that is adapted to cooperate with the stationary electrode 14 so as to effect welds on the pieces of work material 15, 16 that are positioned between the lower end of the movable electrode 13 and the upper surface of the stationary electrode 14. The stationary electrode 14 may include an upwardly projecting stud 18 that centers and maintains the work pieces 15, 16 in proper positions during the welding operation. Obviously some other form of jig or holding device may be used to maintain work pieces 15, 16 in proper position during the welding operation.

Figs. 2-5 show the welding head 11 in detail. Head 11 includes the top disc 21 that is pierced by the radially extending coolant passages 22 and 23 that provide for circulation of a suitable coolant through the rotatable, electrode carrying spindle 25. Coolant passages 22, 23 are connected to passages 27 and 28 respectively for passing coolant downwardly through the spindle shaft 26 to the electrode holder 29. The top disc 21 of the head 11 has a central bore 31 that receives the upper end of the spindle shaft 26. Suitable seals 32 and 33 are mounted in the bore 31 to seal off passage of liquid along the upper end of spindle shaft 26. Seal 32 prevents coolant fluid from passages 22 and 23 from passing into a lubricant retaining chamber 35 located interiorly of the head unit 11 while seal 33 prevents lubricant from the chamber 35 from passing into the coolant passages 22 and 23. Mounted in the chamber 35 is a tapered roller bearing 36 that journals the upper end of the spindle shaft 26 in the head assembly 11 for rotation about a vertically extending axis. Bearing 36 has its outer race supported in insulation mountings 37 to insulate bearings 36 from the supporting head casing element 38. An adjusting nut 39 is threaded on the upper end of the spindle shaft 26 to maintain the bearing 36 in its desired position.

The cylindrical head casing element 38 is connected to the upper disc 21 by the bolt connectors (only one shown) 40 that also connect a second cylindrical casing portion 41 to the casing portion 38 and to the top disc 21. Casing portion 41 has a ring-like bearing 42 mounted concentrically within the bore therethrough. The bearing 42 is drivingly connected to the superimposed casing portion 38 by the pin connector 43 and the bolt connector 44. Each of the connectors 43, 44 prevent rotation of the bearing 42 relative to the casing portions 38, 41. Bolt connector 44 mounts a compression spring 45 that continuously urges the bearing 42 upwardly against the underside of the casing portion 38. Arranged concentrically between the inner peripheral surface of the bearing 42 and the outer periphery of the spindle shaft 26 are a pair of conductor bearings 46 and 47. Bearings 46 and 47 may be made from silver or an equivalent conductor bearing material. The ring-like bearing 42 that surrounds and engages the conductor bearing 46 is also of conductor material and it is held in continuous engagement with bearing 46 by the spring device 50. Spring device 50 comprises a radially extending, tapped bore 51 in the casing portion 41 in which is mounted a plunger element 52 that bears against the outer periphery of the bearing ring 42. A compression spring 53 seated in bore 51 is held under compression by the bore mounted plug 54 so as to continuously urge the plunger 52 against the bearing 42 and the inner periphery of the bearing 42 into conducting engagement with the conductor bearing 46.

With the spindle supporting arrangement herein disclosed, welding current may pass from ram 10 to head disc 21 and down through casing portions 38 and 41 to the bearing ring 42. Current is transferred from the ring 42 through the conductor bearings 46, 47 to the shaft 26 of the spindle 25 and from the spindle 25 through the electrode holder 29 to the movable electrode 13. Coolant passages 27 and 28 in the spindle shaft 26 are connected by passages 57 and 58 respectively to conduits 59 and 60 respectively which latter conduits pass the coolant through the electrode holder 29.

The lower end of the spindle shaft 26 is rotatably supported in the casing portion 41 by a tapered roller bearing assembly 61. The outer race of the bearing assembly 61 is insulated from the casing portion 41 by the insulator bearings 62. With the double bearings arrangement 36, 61 a very rugged yet freely rotatable mounting of the spindle 25 in the head assembly 11 is achieved. A seal 64 carried by the spindle disc portion 65 engages the outer periphery of the casing portion 41 and prevents leakage of lubricant from the bearing receiving chambers 35.

Surrounding the outer periphery of the spindle disc portion 65 is the spindle rotating mechanism 70. The mechanism 70 is designed to provide for rotation of the spindle 25 about its shaft 26 at any desired rate. Mechanism 70 comprises an eccentrically shaped ring 71 that matingly receives the spindle disc portion 65. Ring 71 is rotatably mounted on disc 65 by the upper and lower washer rings 72 and 73 respectively. As clearly shown in Figs. 2, 3 and 4, the width of the ring 71 at the left side of the spindle disc 65 is considerably greater than at the right side of the spindle disc 65. The increased width of ring 71 at the left side of the spindle disc 65 facilitates the mounting of the novel spindle rotating mechanism 70 thereon. Bolts 72' mount a brake cylinder 73' on the outer periphery of the eccentric ring 71 at the left side of the spindle disc 65. This cylinder 73' has a piston 74 mounted in the bore 77 thereof for reciprocable movement. Piston 74 has a thrust transmitting finger 75 at the closed end thereof that is adapted to engage a brake shoe 76 and force the shoe 76 into frictional engagement with the outer periphery of the spindle disc 65 when the bore 77 of cylinder 73' is filled with pressurized fluid. The pressurized fluid for actuation of piston 74 is admitted to cylinder bore 77 through the port 78 that is connected to a pressure fluid (air or liquid) supply line 79.

Extending from the side of the cylinder 73' (see Figs. 2 and 3) are a pair of spaced apart, pierced flanges 81 that provide a yoke formation adapted to be connected to a thrust link 82. The opposite ends of thrust link 82 are pivotally connected to the yoke arms 81 and the piston rod 84 by the pivot pins 85 and 86 respectively. Piston rod 84 is reciprocably mounted in a pressure fluid operated motor cylinder 88 that is mounted on the relatively stationary casing portion 41 by the bolts 89. Cylinder 88 has a double acting piston 90 mounted in its bore 91. Pressurized fluid can be admitted to the bore 91 on one side of piston 90 through the port 93 to cause the piston rod 84 to be actuated in one direction. Pressurized fluid can be admitted to the bore 91 on the other side of the piston 90, through the port 94, to cause the piston rod 84 to be actuated in the opposite direction. The port 93 may be connected by a conduit 95 (see Fig. 1) to the same pressure fluid supply line 96 that supplies pressure fluid to the conduit 79. If such is the case, then it is thought to be obvious that on admission of pressure fluid to conduit 96 the brake shoe 76 will be applied to the spindle disc 65 and at the same time the piston rod 84 will be actuated in a direction that will cause the spindle 25 to be rotated counterclockwise.

The head end of the cylinder 88 has a head plate 98 that mounts a sleeve guide 99 for the head end 84a of the piston rod. Threadably seated in the cylinder head plate 98 is a bolt 100 that can be adjusted to control the length of the working stroke of the piston 90. The inner end of bolt 100 abuts the outer end of piston rod guide 84a to limit the piston rod stroke in one direction.

The flange 84b on the piston rod 84 is adapted to engage the bottom end of the cylinder bore 101 to limit movement of the piston rod in the opposite direction. It is thought to be obvious that when pressurized fluid is supplied to port 93 to effect rotation of the spindle 25, that the port 94 is connected to a vent or drain and vice versa when pressurized fluid is supplied to port 94 to retract the piston rod 84, that ports 93 and 78 are connected to a vent or drain.

From the preceding description it is thought to be clear that admission of pressurized fluid to conduit 96 will cause the brake 76 to be applied to the spindle disc 65 so that the accompanying working stroke of the piston 90 will then cause the spindle 25 to rotate counterclockwise an amount depending on the setting of the adjustment screw 100. On release of the pressure fluid in supply conduit 96 the brake 76 is released from the spindle disc 65 so that thereafter on admission of pressure fluid to the conduit 103 and port 94 to effect the retraction stroke of piston 90, the spindle 25 will not be rotated in a clockwise direction.

As previously pointed out it is one of the objects of this invention to provide a mechanism for accomplishing stitch welding in circular patterns, among other things, and the aforementioned spindle rotating mechanism 70 is thought to accomplish circular stitch welding in a novel manner. In addition to the aforementioned spindle rotating mechanism 70, this stitch weld head assembly 11 includes means to vary the diameter of the circle traversed by the welding electrode 13 during its welding operation. Figs. 2 and 5 show that the lower face of the spindle disc 65 is formed with a guideway slot of T-shaped cross sectional configuration. Slot 110 extends diametrically across the lower face of spindle disc 65 and has a T-shaped crosshead 111 slidably mounted therein. Crosshead 111 has a portion of its stem 112 that projects downwardly below the lower face of the spindle disc 65 and is seated in a mating recess 113 in the electrode holder block 114. A bolt 115 extends through the block 114 and is threaded into the crosshead 111. It is thought to be obvious that the slidable crosshead 111 and its associated bolt structure 115 permit variation in the diameter of the circular pattern that will be described by rotation of the spindle 25 during welding operations. Of course if a circular pattern is not desired, then the electrode 13 can be aligned with the rotational axis of the spindle 25 and then the electrode 13 will be relatively stationary and the work pieces can be moved thereunder to weld in any desired pattern.

Fig. 6 shows a modified form of stitch welding head assembly 11'. In the assembly 11', the upper or top disc 21' is identical to the top disc 21 of the assembly shown in Fig. 2. The head assembly 11' is more compact than the assembly 11 due to the fact that only a single bearing assembly 161 is used to support the rotatable spindle 25' as contrasted with the pair of bearing assemblies 36, 61 used in the Fig. 2 form of the invention. As a result of the use of only a single bearing 161, the Fig. 6 form of the invention uses a spindle 25' with a spindle shaft 26' of reduced length. Accordingly the casing of the head unit 11' is of reduced height and is composed of only the single casing portion 41' instead of the two casing portions 38 and 41 as shown in Fig. 2. The top disc 21' is detachably connected to the ram 10 by the bolts 12. Disc 21' has the coolant passages 22' and 23' the same as disc 21 and is also formed with a spindle shaft receiving bore 31' that supports the seals 32' and 33'. The lubricant receiving chamber 35' is formed in the lower portion of the bore 31'. The upper end of the spindle shaft 26' is journaled in the bore 31' in casing portion 21' and is rotatably supported in the ball bearing assembly 161 that is mounted in the casing portion 41'. Casing portion 41' is substantially cylindrical in form and is connected to the top disc 21' by the bolt connectors 40'. The casing portion 41' has the bearing assembly 161 mounted therein by means of insulator bearing elements 162 so as to prevent the passage of welding current from the casing portion 41' through the bearing assembly 161 to the spindle shaft 26'. Bearing assembly 161 is held in position by means of the nut 39' that is threaded on the upper portion of spindle shaft 26'. Nut 39' is positioned to exert a downward force on the spaced apart washer discs 163 and 164 that have a group of compression springs 165 mounted therebetween. A pin 166 extends between the washer plates 163 and 164 to prevent relative rotation between plates 163 and 164. As a result of the mounting of the bearing 161 in the casing portion 41' and the seating of the compression springs 165 on the bearing 161 in the manner described, the springs 165 continually exert an upward force on the spindle 25' so as to maintain the ring-like conductor bearings 180, 181 and 182 in continuous engagement. Accordingly a good electrical contact exists across bearings 180, 181 and 182 at all times.

Casing portion 41' may be drilled with passages 167 that are connected to a lubricant filler cup 168 to provide a means for readily supplying lubricant to the bearing assembly 161 and the conductor bearings 180, 181 and 182.

The conductor bearing 180 is a washer like ring of conductor material that is connected to the lower face of the casing portion 41' by the bolts (only one shown) 184. Conductor bearing 181 is another washer-like bearing of good conductive properties that is fixedly mounted on the lower face of the casing mounted bearing 180. Bearing 181 may be made of silver or like material. Conductor bearing 182 is another washer-like bearing of good conductive properies that is fixedly connected to the upper face of the spindle disc portion 65' by the bolt connectors (only one shown) 185. The sandwich bearing construction 180, 181, 182 provides a large surface area for the transfer of welding current from the casing portion 41' through bearings 180, 181, 182 to the spindle disc 65' and thence to the spindle supported electrode 13.

The spindle shaft 26' is bored and provided with a tub 190 to provide the coolant passages 27' and 28' that connect with the coolant passages 57' and 58' in the disc portion 65' of the spindle 25'. Coolant passages 57' and 58' are connectible to conduits 59 and 60 respectively that transfer the coolant liquid to the electrode holder 29. The electrode holder 29 is identical to that described relative to Figs. 2 and 5 and is connected to a T-shaped slot 110' in the lower face of the spindle disc 65' as previously described. The upper face of the spindle disc 65' mounts a lubricant seal 64 to prevent loss of lubricant from the bearing chambers.

Attached to the outer periphery of the spindle disc portion 65' is the novel spindle rotating mechanism 70 that was completely described relatively to the Fig. 2 form of welding head assembly.

With the form of the invention shown in Fig. 6, welding current can readily pass from head support 10 through the casing portions 21', 41' to the conductor bearings 180, 181, 182 and then into the disc portion 65' of the spindle and down through the holder 29 to the electrode 13.

As a result of the novel spindle rotating mechanism both overlapping and circumferentially spaced apart stitch welds may be readily and accurately accomplished. Furthermore, expensive gearing is not required to rotate the spindle and it is a simple matter to vary the spacing of the spot welds over an infinite scale.

I claim:
1. An electrode supporting assembly for attachment to an electrically operated spot welding machine comprising a casing with a bore therein, a spindle of inverted T-shaped cross secctional configuration including connected shaft and disc portions, said spindle having portions of its shaft concentrically arranged within said casing bore, a journal bearing assembly having an insulated outer periphery mounted in said bore and arranged concentrically between said casing and the forementioned portions of the spindle shaft to rotatably support said spindle in said casing, conductor bearings extending between adjacent portions of said casing and said spindle to provide means for the transfer of electrical energy therebetween, resilient means mounted on said casing and arranged to continuously urge said adjacent portions of the casing and spindle into engagement with said conductor bearings, and an electrode holder mounted on the end face of said spindle disc portion for rotation therewith, the mounting for said electrode holder including means to adjustably position and anchor said holder on the spindle disc end face at variable radial distances from the axis of rotation of the spindle.

2. An electrode supporting assembly for attachment to an electrically operated spot welding machine comprising a casing, a spindle of inverted T-shaped cross sectional configuration including connected shaft and disc portions, said spindle having portions of its shaft concentrically arranged within said casing, a journal bearing assembly having an insulated outer periphery arranged concentrically between said casing and the aforementioned portions of the spindle shaft to rotatably support said spindle in said casing, conductor bearings extending between adjacent portions of said casing and said spindle to provide means for the transfer of electrical energy therebetween, resilient means mounted on said casing and arranged to continuously urge said adjacent portions of the casing and spindle into engagement with said conductor bearings, an electrode holder mounted on said spindle disc portion for rotation therewith, a spindle rotating mechanism mounted on said casing having brake portions engageable with said spindle to transmit rotary drive thereto, said spindle rotating mechanism comprising a ring-like member arranged concentrically about the outer periphery of said spindle disc and mounted thereon for rotation relative thereto, a brake shoe element mounted on said ring-like member for radial movement with respect to said spindle disc, said brake shoe being adapted to be brought into frictional engagement with the outer periphery of the spindle disc, and a motor means mounted on said casing and connected by thrust transmitting linkage to said brake shoe to effect rotation of said brake shoe after contact of the shoe with the spindle disc.

3. An electrode supporting assembly for attachment to an electrically operated spot welding machine comprising a casing, a spindle of inverted T-shaped cross sectional configuration including connected shaft and disc portions, said spindle having portions of its shaft concentrically arranged within said casing, a journal bearing assembly having an insulated outer periphery arranged concentrically between said casing and the aforementioned portions of the spindle shaft to rotatably support said spindle in said casing, conductor bearings extending between adjacent portions of said casing and said spindle to provide means for the transfer of electrical energy therebetween, resilient means mounted on said casing and arranged to continuously urge said adjacent portions of the casing and spindle into engagement with said conductor bearings, an electrode holder mounted on said spindle disc portion for rotation therewith, and a spindle rotating mechanism mounted on said casing comprising friction brake portions movably mounted on and engageable with said spindle to transmit rotary drive thereto, thrust transmitting means connected to and arranged to effect rotation of said friction brake portions, and power operated means to cause engagement of said brake portions and said spindle and the application of torque producing forces to said brake portions to effect simultaneous rotation of the brake portions and said spindle.

4. An electrode supporting assembly for attachment to an electrically operated spot welding machine comprising a casing, a spindle of inverted T-shaped cross sectional configuration including connected shaft and disc portions, said spindle having portions of its shaft concentrically arranged within said casing, a journal bearing assembly having an insulated outer periphery arranged concentrically between said casing and the aforementioned portions of the spindle shaft to rotatably support said spindle in said casing, conductor bearings extending between adjacent portions of said casing and said spindle to provide means for the transfer of electrical energy therebetween, resilient means mounted on said casing and arranged to continuously urge said adjacent portions of the casing and spindle into engagement with said conductor bearings, an electrode holder mounted on said spindle disc portion for rotation therewith, and a spindle rotating mechanism mounted on said casing having drive transmitting portions engageable with said spindle to transmit rotary drive thereto, said drive transmitting portions comprising a first member movably mounted on said spindle for selective drive transmitting engaement therewith, a second torque transmitting member connected to said first member at a point offset radially from the rotational axis of said spindle, and power operated means to simultaneously cause drive transmitting engagement of said first member and said spindle and the application of force to said second member so as to apply torque to said spindle and effect rotation thereof.

5. A disc rotating assembly comprising a concentrically arranged, ring-like element supported on said disc for rotation relative thereto, a brake shoe mounted on said ring-like element for movement relative thereto, said shoe being arranged for selective frictional engagement with said disc, actuating mechanism mounted on said ring-like element to effect movement of said brake shoe into engagement with said disc, and actuating means for effecting rotation of said disc comprising a reciprocable piston, adapted to be mounted on a relatively fixed member, said piston having thrust linkage connecting it to said ring-like element and said linkage being arranged such that the piston can apply torque to said ring-like element to effect rotation thereof.

References Cited in the file of this patent

UNITED STATES PATENTS

| | | |
|---|---|---|
| 795,095 | Benoit | July 18, 1905 |
| 935,235 | Sargent | Sept. 28, 1909 |
| 1,172,302 | Murray | Feb. 22, 1916 |
| 1,236,091 | Kicklighter | Aug. 7, 1917 |
| 1,322,333 | Noonan | Nov. 18, 1919 |
| 1,595,898 | Loewy | Aug. 10, 1926 |
| 1,862,173 | Bertram | June 7, 1932 |
| 1,946,445 | Ragsdale | Feb. 6, 1934 |
| 2,234,232 | Chambers | Mar. 11, 1941 |
| 2,237,747 | Platz | Apr. 8, 1941 |
| 2,310,556 | Strong | Feb. 9, 1943 |
| 2,529,634 | Sciaky | Nov. 14, 1950 |

FOREIGN PATENTS

| | | |
|---|---|---|
| 763,838 | France | Feb. 19, 1934 |